United States Patent [19]
Goldberg et al.

[11] 3,720,658
[45] March 13, 1973

[54] CHOLESTERYL P-PHENYLAZOPHENYL CARBONATE

[75] Inventors: Newton N. Goldberg, Pittsburgh, Pa.; James L. Fergason, Kent, Ohio

[73] Assignee: Westinghouse Electric Corporation, Pittsburgh, Pa.

[22] Filed: Aug. 9, 1971

[21] Appl. No.: 170,269

Related U.S. Application Data

[62] Division of Ser. No. 820,661, April 30, 1969, Pat. No. 3,627,699.

[52] U.S. Cl. ................................................ 260/207.1
[51] Int. Cl. ........................................... C07c 107/06
[58] Field of Search ......................... 260/207.1, 207

[56] References Cited

UNITED STATES PATENTS

| | | | |
|---|---|---|---|
| 3,114,836 | 12/1963 | Fergason | 250/83 |
| 3,401,262 | 9/1968 | Fergason | 250/83 |

*Primary Examiner*—Lewis Gotts
*Assistant Examiner*—C. F. Warren
*Attorney*—F. Shapoe et al.

[57] ABSTRACT

Electromagnetic radiation in the frequency range of about $10^{15}$ to $10^{17}$ cycles per second is detected, using a cholesteric liquid-crystal material to which there has been added cholesteryl p-phenylazophenyl carbonate, a novel compound.

1 Claim, No Drawings

CHOLESTERYL P-PHENYLAZOPHENYL CARBONATE

CROSS-REFERENCE TO RELATED APPLICATIONS

This application is a division of application Ser. No. 820,661, filed Apr. 30, 1969 now U.S. Pat. No. 3,627,699.

BACKGROUND OF THE INVENTION

1. Field of the Invention

This invention generally relates to novel compositions of matter, these being materials that are liquid crystals of the cholesteric phase, into which there has been incorporated cholesteryl p-phenylazophenyl carbonate. The invention more particularly relates to the novel sensitizing carbonate compound.

2. Description of the Prior Art

Many materials are known that exhibit cholesteric-phase liquid crystals within a certain temperature range. See, for example, the compositions mentioned In U.S. Pat. No. 3,114,836 in the passage from column 6, line 61 to column 7, line 21. See also, for example, the compositions mentioned in British Pat. No. 1,041,490, in the passage from line 5 to line 102 of page 4.

As mentioned in the above patents, cholesteric liquid-crystal compositions have numerous interesting properties, one of which is that these compositions have a temperature range within which they exhibit noticeable changes in color, generally as the result of relatively small changes in temperature. For the most part, these changes in color take place quite rapidly when the composition is exposed to a new temperature. Prior to the instant invention, however, there have not been known and studied any materials that contain cholesteric-phase liquid crystals and are known to be responsive to radiation within the frequency range hereinabove mentioned.

Devices for detecting radiation of the frequency range hereinabove mentioned incident thereon have, before this invention, usually comprised films containing suitable sensitive material, with it being necessary that the film be subjected to a separate developing operation before the quantity of radiation that it has received can be determined. Devices using such film have been built and used, despite the fact that the need for such separate development operation makes the use of such devices not only a great deal more inconvenient but also substantially more costly than the use of a direct-reading device, such as may be obtained with the present invention.

There is also known a physical phenomenon that is called "phototropism" or "photochromism". This phenomenon is that certain substances, when subjected to suitable activating radiation, change their apparent color. The phenomenon is to be distinguished from fluorescence or phosphorescence, which involves an actual absorption and re-emission of light energy. The "phototropism" phenomenon is discussed in considerable detail in a paper written by Glenn H. Brown and Wilfrid G. Shaw, Reviews of Pure and Applied Chemistry, Vol. 11, No. 1, pages 2–32, March 1961. As those authors explain, there appears to be a substantial number of different possible explanations for the phototropic behavior of a substance. Some isomerize, others form tautomers or free radicals, and still others appear to form molecular aggregations. Some appear to undergo chemical reaction with, for example, oxygen of the air or with water, since their color change does not take place in vacuum or in the absence of water. The phototropic change sometimes occurs very slowly, and sometimes quite rapidly. Some substances give a phototropic change that seems quite temperature-dependent, or requires activating radiation of a fairly specific frequency, while other substances appear quite insensitive to these parameters. In particular, there are a number of azo compounds that appear to give a phototropic effect as a result of cis-trans isomerization, with the change being very rapid, on the order of a microsecond, matching the order of rapidity of the color change in cholesteric-liquid-crystal material in response to a change in temperature. So far as we are aware, however, there is no teaching in the prior art of the practice of mixing with a cholesteric liquid-crystal material any such phototropic substance.

BRIEF SUMMARY OF THE INVENTION

The novel compound cholesteryl p-phenylazophenyl carbonate is added to cholesteric-phase liquid-crystal compositions to provide materials that show sensitivity to radiation in the frequency range of $10^{15}$ to $10^{17}$ cycles per second. The compositions containing the novel carbonate of this invention may be of use in imaging devices, i.e., devices for the purpose indicated in U.S. Pat. No. 3,114,836, as well as in other ways that will suggest themselves to persons skilled in the art.

DESCRIPTION OF THE PREFERRED EMBODIMENTS

In one general aspect, the present invention concerns a method for detecting electromagnetic radiation that comprises preparing a composition that contains at least an effective amount of a derivative of cholesterol or cholestanol, with the composition that is being prepared being of such nature, as respects the temperature range within which it exhibits a color play, that considering the amount of sensitizing compounds that is present therein (anything from a small but an effective amount up to a major portion, such as about 60 percent, of the total composition, by weight) and the approximate temperature of the intended use, and also the intensity of the radiation that is to be detected, there is obtained, whenever the composition is exposed to radiation of the wavelength and intensity and dosage to be detected, a noticeable change in color of the composition. To this end, the composition is prepared by being put into a suitable physical form, such as by being made into a film having a thickness of about 5 to 50 microns disposed on a suitable substrate, such as a plastic film of polyethylene terephthalate provided with a coating of black paint or the like.

It is to be understood that it will be essential to use, for the material sensitive to electromagnetic radiation within the frequency range mentioned above, a material comprising a major part of the cholesterogenic material, i.e., a material that, as mentioned above, undergoes within a particular temperature range characteristic of the material a color play, changing in color from red through violet, with this cholesterogenic material having incorporated therein, as taught in accordance with the present invention, an additional material suitable for use in the detection of electromagnetic radiation within the frequency range intended to be detected.

In accordance with the present invention, there is used, as an additive to cholesterogenic material, an oil-soluble dye that is capable of absorbing the radiation within a particular frequency range. The dye that is used is particularly sensitive to or absorptive of radiation in frequency ranges corresponding to the frequency range of radiation that is intended to be detected. If, for example, it may be desirable to obtain detection of the amount of radiation of the infrared or heat type produced by, for example, an atomic blast, there is added to the cholesterogenic material an oil-soluble dye, especially one having a high absorption coefficient, such as brilliant green, methyl orange, National azo oil black, Heliogen Blue BK powder, Heliogen Green GA powder, green gasoline dye (such as that sold by Fisher Scientific Company as "Fisher 6025"), blue gasoline dye (such as that sold by Fisher Scientific Company as "Fisher 6530"), or yellow gasoline dye (such as that sold by Fisher Scientific Company as "Fisher 6520"). Other dyes that may be used include azo dyes, including such amino-axobenzene derivatives as "Celliton" and "Scarlet B" and such betanapthol derivatives as "Scarlet GG". Also included are triphenylmethane dyes, such as Malachite Green, diphenylmethane dyes such as auramine, acridine dyes such as acridine orange, and indigo dyes such as indigo purpurin or indigo white.

Essential to the idea of the invention is that the novel sensitizing carbonate may be incorporated in an otherwise suitable cholesterogenic material. The novel carbonate responds to and absorbs radiation of a particular wavelength, with the effect being that the structure, and therefore the color response of the cholesterogenic material, is thus substantially altered, a relatively small change in the energy content of the film or the like of cholesterogenic material being transformed as the result of the presence of the sensitizing carbonate in that film or the like, into a change that is a great deal more vivid and recognizable, namely, in the color response of the bulk of cholesterogenic material itself.

The foregoing phototropic materials are included in cholesterogenic materials when the frequency of the electromagnetic radiation to be detected is between $10^{14}$ and $10^{15}$ cycles per second. For the detection of the electromagnetic radiation of somewhat greater frequency, such as about $10^{15}$ to $10^{17}$ cycles per second, i.e., for the detection of electromagnetic radiation in the general range of the ultraviolet, the use of additives somewhat different is preferred. For example, the addition of 5 parts of beta-carotene to a cholesterogenic material consisting essentially of 40 parts by weight of cholesteryl nonanoate and 60 parts by weight of oleyl cholesteryl carbonate, there is obtained a composition that exhibits a color change from green to blue upon its exposure to ultraviolet radiation. Other substances that might be used in place of beta-carotene include other azo compounds that will undergo rapid cis-trans isomerization when activated by radiation. Such azo compounds will not, generally, themselves exhibit cholesteric-phase liquid crystals. One azo compound that is capable of such isomerization and also does form cholesteric-phase liquid crystals is the novel cholesteryl p-phenylazo-phenyl carbonate of this invention.

As will be understood by those skilled in the art, the cholesterogenic material within which the novel sensitizing carbonate is incorporated may vary considerably in chemical composition, depending upon the requirements of the application involved. It will be desirable, in most instances, that the basic cholesterogenic material to which the sensitizing material is added exhibit its color play at about the temperature of use or slightly higher, and that the material used have a speed of response to changes in the conditions to which it is subjected adequate for the intended purposes (some cholesterogenic materials will change color twenty times in a second, but others may require several hours to make one change; compositions of the former kind are useful where a condition is to be read directly, without a permanent record being made, but compositions of the latter kind are more useful for applications that involve exposures over a long period of time, with it being desired that a "permanent" record be made of the observed changes, if any).

Whatever the nature of the sensitizing material used, the preferred procedure is substantially the same, once that a suitably sensitized cholesterogenic material has been prepared. The sensitized cholesterogenic material is dissolved in a suitable organic solvent such as benzene, chloroform, petroleum ether or the like, and this is applied to a suitable substrate, such as film of polyethylene terephthalate or other clear plastic film painted, on the side opposite that to which the cholesterogenic material is applied, with black paint. In some instances the sensitive material, for example the oil soluble black dye, will absorb the radiation and serve as an appropriate background. It is possible, of course, to use a plastic film that is not provided with a black paint backing or black dye, but in such cases, the cholesterogenic material will, as is well understood, exhibit colors that, at a given temperature, or under given conditions or exposure, are the complement of those exhibited by a specimen having a black color; for example, a specimen made of a film having a black paint backing and exhibiting a red color would, if the black paint backing were omitted, appear green. The solution is sprayed on the backing material, and then the organic solvent is permitted to evaporate therefrom, to leave a film or stratum having a thickness of, for example, about 5 to 50 microns. The film, so treated, is then utilized in a manner suitable to the intended application. The stratum may also be formed from capsules containing the cholesterogenic material. The encapsulating material may be a translucent plastic film, for example.

Part of the teaching of the present invention that is considered unobvious to a person of ordinary skill in the art is that it is possible, with a relatively small amount of the sensitizing cholesteryl p-phenylazophenyl carbonate incorporated in the cholesteric liquid-crystal material, to obtain a relatively vivid change in the appearance of the cholesteric liquid-crystal material. Another item not obvious to a person of ordinary skill in the art, prior to being apprised of this invention, is that it is not necessary, in order to obtain sufficient energy absorption to get the liquid-crystal film to change color, to use an amount of the novel sensitizing carbonate so great that there would be other difficulties. Another difficulty to be expected is that a sensitizing material might itself also absorb visible radiation attempting to leave the cholesteric liquid-crystal material to such an extent that it would be difficult or impossible to notice any color changes as a result of changes in radiation incident upon the film of cholesteric liquid-crystal material containing the sensitizing material. Indeed, with some combinations of materials, these very difficulties may sometimes be encountered but according to the present invention, it is taught that when the amount of the novel sensitizing carbonate used is kept sufficiently low, these difficulties are avoided and at the same time it is usually possible to obtain the beneficial effects indicated above.

The invention disclosed above is illustrated by the following specific examples:

EXAMPLE I

Cholesteryl paraphenylazophenyl carbonate is prepared as follows. To a flask, there are added, dissolved in 75 milliliters of benzene, 22.5 grams (0.05 mol) of cholesteryl chloroformate. There are added 3.9 grams (0.05 mol) pyridine dissolved in 5 milliliters of benzene. Then, to the flask, there is added a suspension of 10.0 grams of paraphenylazophenol (0.05 mol) in benzene. The materials in the flask are then heated to reflux temperature and retained at the reflux temperature for 2 hours with stirring. The resultant reaction mixture was cooled and filtered to remove the precipitated pyridine hydrocholoride. To the filtrate, methanol is added, causing the product, cholesteryl paraphenylazophenyl carbonate, to be precipitated from the solution. This precipitate is then recrystallized from the benzene-methanol solution in a yield of better than 90 percent, based upon the quantity of cholesteryl chloroformate charged. It exhibits a melting point range of 166°–167.5°C and gives a bright, vivid color play at a temperature slightly above that. The novel compound may be used as taught in the following examples, as well as in many other ways that will suggest themselves to persons of ordinary skill in this art.

EXAMPLE II

To a piece of polyethylene terephthalate film about 0.00025 inch thick, there is applied on one side a coating of black spray enamel. Then, to the other side of the film there is applied a liquid made by mixing into 500 milliliters of a mixture of petroleum ether in choloroform of the following materials: 30 grams of oleyl cholesteryl carbonate, 20 grams of cholestryl nonanoate, and 1 gram of cholesteryl paraphenylazophenyl carbonate. (Cholesteryl papaphenylazophenyl carbonate is a novel compound, prepared as indicated above in Example I.) The liquid thus applied to the other side of the polyethylene terephthalate film is permitted to dry, leaving a stratum about 0.25 micron thick on the one side of the film. After the solvent evaporates, a further layer of polyethylene terephthalate is placed over the liquid crystal material, in vacuum. The film thus prepared is exposed to ultraviolet radiation, using a filtered AH-4 mercury photoflood. Ordinary negatives may be used to place an image on the films for evaluation of gray scale and resolution. It is found that approximately 40 shades of discrimination are available, using this technique, and the spatial resolution is in excess of 20 lines per millimeter. The effects of the ultraviolet radiation on the liquid-crystal material are reversible. After being heated to about 150°C for 30 seconds, or being allowed to remain at 30°C for 8 hours, the film appeared as if it had not been exposed.

EXAMPLE III

Example II was repeated, except that twice as much of the novel carbonate was used. The film thus obtained was slightly more sensitive to ultraviolet radiation, but the results are otherwise the same.

EXAMPLE IV

Example II was repeated, except that seven times as much of the novel carbonate was used. The results were substantially the same as in Example III (no noticeable improvement in sensitivity), with the further development that the liquid-crystal material comprising the film tended to crystallize to a true solid.

The above-mentioned tendency to undergo true-solid crystallization was observed whenever amounts of the novel carbonate as great as five times the amount used in Example II were used, and when as much as ten times as the quantity, of novel carbonate used in Example II was used, there was obtained a material that ceased to respond to ultraviolet light.

EXAMPLE V

Example II was repeated, except that half of the novel carbonate was replaced with cholesteryl paraphenylazobenzoate. The results were the same as in Example II.

EXAMPLE VI

Example V was repeated, except that there was used five times as much as both the benzoate and the novel carbonate. The results were similar to those observed in Example II except that the cholesteric-phase liquid-crystal material tended to crystallize to a true solid within several minutes.

Cholesteryl paraphenylazophenyl carbonate may thus be used as a sensitizing compound in cholesteric-phase liquid-crystal compositions.

We claim as our invention:

1. Cholesteryl p-phenylazophenyl carbonate.

* * * * *